United States Patent
Ohyama

Patent Number: 5,740,339
Date of Patent: Apr. 14, 1998

[54] OUTPUTTING METHOD AND APPARATUS

[75] Inventor: Naoki Ohyama, Machida, Japan

[73] Assignee: Canon Kabushiki Kaisha, Tokyo, Japan

[21] Appl. No.: 390,167

[22] Filed: Feb. 17, 1995

Related U.S. Application Data

[63] Continuation of Ser. No. 65,031, May 24, 1993, abandoned, which is a continuation of Ser. No. 785,937, Oct. 31, 1991, abandoned.

[30] Foreign Application Priority Data

Nov. 26, 1990 [JP] Japan ................ 2-324564

[51] Int. Cl.$^6$ .................................................. G06K 15/00
[52] U.S. Cl. .................................... 395/117; 395/115
[58] Field of Search .................................. 395/101, 102, 395/135, 109, 112, 110, 117; 400/65; 358/462, 453; 382/254, 256, 284; 345/115, 116, 136

[56] References Cited

U.S. PATENT DOCUMENTS

| | | | |
|---|---|---|---|
| 4,437,122 | 3/1984 | Walsh et al. | 358/166 |
| 4,751,585 | 6/1988 | Shibazaki | 358/298 |
| 4,878,126 | 10/1989 | Ichikawa | 358/451 |
| 4,894,221 | 1/1990 | Stoffel | 358/283 |
| 4,899,225 | 2/1990 | Sasaga et al. | 358/448 |
| 4,974,171 | 11/1990 | Yeh et al. | 395/112 |
| 5,045,869 | 9/1991 | Isata et al. | 358/453 |
| 5,065,437 | 11/1991 | Bloomberg | 358/462 |
| 5,086,346 | 2/1992 | Fujisawa | 358/453 |
| 5,134,667 | 7/1992 | Suzuki | 382/54 |

FOREIGN PATENT DOCUMENTS

| | | | |
|---|---|---|---|
| 216536 | 4/1987 | European Pat. Off. | 395/117 |
| 385421 | 9/1990 | European Pat. Off. | 395/117 |

OTHER PUBLICATIONS

Patent Abstracts of Japan, vol. 12, No. 432 (Kokai 63–166550) (Nov. 1988).

*Primary Examiner*—Arthur G. Evans
*Attorney, Agent, or Firm*—Fitzpatrick, Cella, Harper & Scinto

[57] ABSTRACT

There are disclosed a method and apparatus for outputting a document in which a character area and an image area mixedly exist, wherein the character area and the image area are discriminated and a document is outputted in a manner such that the smoothing process is automatically executed in the character area and is not performed in the image area, on the basis of the result of the discrimination, in the case where the resolution is changed. Thus, the document can be generated at a high quality by the smoothing process, as if the document were generated at an output resolution which is equal to or higher than the actual output resolution.

10 Claims, 8 Drawing Sheets

1-1 (300DTP)

1-2 (600 DTP WITHOUT SMOOTHING)

1-3 (600 DTP WITH SMOOTHING)

SUPPLEMENTARY DOT

BEFORE SMOOTHING → AFTER SMOOTHING

BEFORE SMOOTHING → AFTER SMOOTHING

BEFORE SMOOTHING → AFTER SMOOTHING

OUTPUTTING METHOD AND APPARATUS

This application is a continuation of application Ser. No. 08/065,031 filed May 24, 1993, which is a continuation of application Ser. No. 07/785,937, filed Oct. 31, 1991, both now abandoned.

BACKGROUND OF THE INVENTION

1. Field of the Invention

The invention relates to outputting method and apparatus in which in the case where a character area and an image area mixedly exist, the character area is automatically smoothed and the image area is not smoothed, for outputting.

2. Related Background Art

Hitherto, in a printing apparatus, there has occurred a problem such that, for instance, when the resolution of 300 d.p.i. is raised to 600 d.p.i., a character balance is not obtained, as shown in FIG. 3A or 3B. As shown in FIG. 3C, therefore, the above problem is solved by the smoothing function to keep the character balance by automatically adding supplementary dots. Such a smoothing function is a necessary technique in order also to obtain an output result of a high quality such that it has a visual effect similar to what is would have if it were outputted at a higher resolution, without actually raising the resolution.

When dark/light states are expressed and generated in the printing apparatus, a binary method or a multi-value method exists. There is a density pattern method in the binary method for a gradation expression. For instance, assuming that ten kinds of density patterns exist for an input image signal as shown in FIGS. 4-1 to 4-10, this means that ten densities (0 to 9) exist. Therefore, when a smoothing process is executed on image information whose gradation expression is performed by the density pattern method of the binary method mentioned above, there occurs a disadvantage such that the image information is deformed as shown in FIG. 5.

SUMMARY OF THE INVENTION

It is an object of the invention to provide an outputting method and apparatus having a function such that in the case where character data and image data mixedly exist in the same page and a smoothing process is executed in a printing apparatus, by properly performing memory management, the smoothing process is automatically executed on the character data and is not performed on the image data.

In one aspect of the invention is provided an outputting method and apparatus in which an area where the smoothing function is made operative and an area where the smoothing function is not operative are discriminated by address information to thereby make the smoothing function operative, practically speaking, a start address, an end address, and the like of the area where the smoothing process is not executed are held, thereby discriminating the on/off operation of the smoothing process.

BRIEF DESCRIPTION OF THE DRAWINGS

FIGS. 4-1 to 4-10 are explanatory diagrams of density patterns;

FIG. 5 is a comparison explanatory diagram before and after the smoothing of image data;

FIG. 6 is a flowchart of an explanatory diagram;

FIG. 7 is an explanatory diagram of processes corresponding to the case of changing a resolution;

FIG. 8 is a diagram showing a structure of a laser beam printer; and

FIG. 9 is a diagram showing a structure of an ink jet printer.

DETAILED DESCRIPTION OF THE PREFERRED EMBODIMENTS

The preferred embodiments of the invention will be described in detail hereinbelow with reference to the drawings. The invention can be applied to an outputting apparatus which is constructed of one or a plurality of apparatuses. Further, the invention also incorporates the case where the invention is accomplished by supplying a program to those apparatuses.

Figure 1:
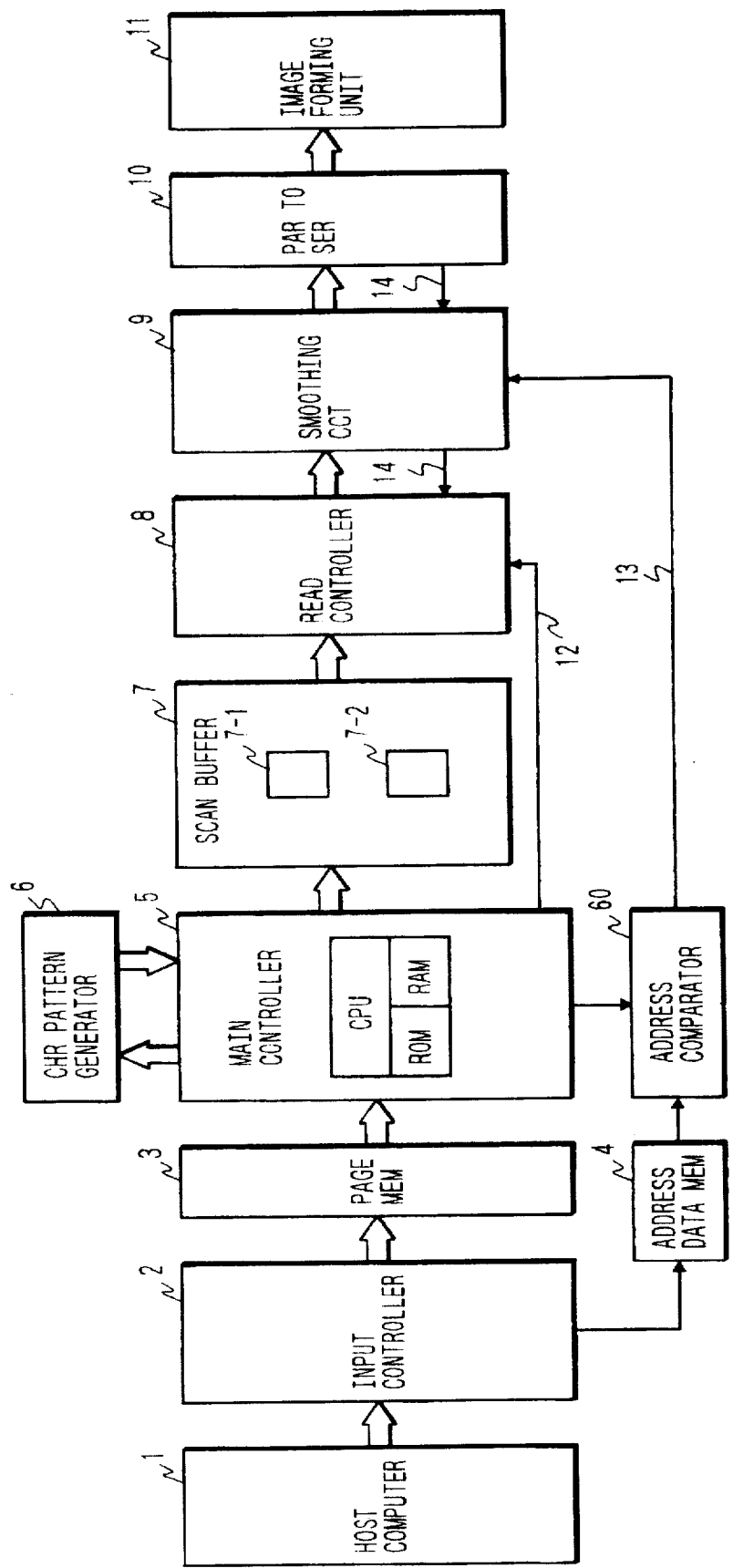
FIG. 1 is a block diagram of a printing apparatus.

FIG. 1 is a block diagram showing an outline of a printing apparatus according to a preferred embodiment of the invention. FIG. 6 is a control flowchart illustrating control by an input controller 2, a main controller 5, a read controller 8, and the like in FIG. 1. The embodiment will now be described hereinbelow with reference to FIGS. 1 and 6.

In FIG. 1, reference numeral 2 denotes the input controller which receives character data or image data from an external apparatus such as a host computer 1 or the like. The image data or the like supplied from the external apparatus through the input controller 2 is stored in a page memory 3 having a capacity of at least one page. The data which is stored into the page memory 3 includes image information, character information, control codes to designate an emphasized character, and the like.

In the input controller 2, a start address and an end address of image data which does not need smoothing are stored in an address data memory 4 by judging on the basis of a code system of the data which is sent from the host computer (step S1 in FIG. 6).

Reference numeral 5 denotes the main controller to control the whole printing apparatus. The main controller 5 has a CPU such as a microprocessor or the like, an ROM in which control programs and data are stored, an RAM for a work area, a TTL for a hard logic or a gate array, and the like.

Data which is read out of the page memory 3 is supplied to the main controller 5 (step S2). When the data supplied to the main controller 5 is the character data, a character image is generated from a character pattern generator 6 and supplied to the main controller. When the input data is the image data, the image data is transferred to a scan buffer 7, which will be explained hereinlater. The discrimination between the character data and the image data can be also performed on the basis of a command of a page description language.

Reference numeral 7 denotes the scan buffer to store pattern data of one scanning line which is scanned by a laser beam in the pattern data of one line to be printed (steps S3, S4, S5).

When the pattern data of one scan is stored in a scan buffer 7-1, the data in the scan buffer 7-1 is read out and is sent as a video signal to a printer engine, by which an image is formed. At the same time, the next pattern data of one scan is stored in a scan buffer 7-2. Similarly, when a video signal is generated from the scan buffer 7-2, the data is stored in the scan buffer 7-1. The operations are repetitively executed as mentioned above.

Reference numeral 8 denotes the read controller to control the reading operation from the scan buffer. In response to a reading signal 12 from the main controller 5, the read controller 8 starts to read out the data from the corresponding scan buffer and supplies the data to a corresponding parallel-to-serial (P/S) converter 10 synchronously with a horizontal sync signal 14 of an image forming unit 11. Reference numeral 9 denotes a smoothing circuit to execute the smoothing process (steps S3, S4, S5). Since the detailed description of the smoothing process itself is well-known and is not essential in the invention, it is omitted here.

An address of the data supplied from the page memory 3 to the main controller 5 is compared with a value in the address data memory 4 by an address comparator 60 through a data bus. When the address lies within a predetermined range in the address data memory, that is, when it indicates the image data or the like which does not need smoothing, a smoothing on/off line of a signal line 13 is set to the smoothing off mode, thereby automatically turning off the smoothing circuit (S6, S7, S8, S9).

The on/off mode of the smoothing can be determined by the above operations.

Figure 2:
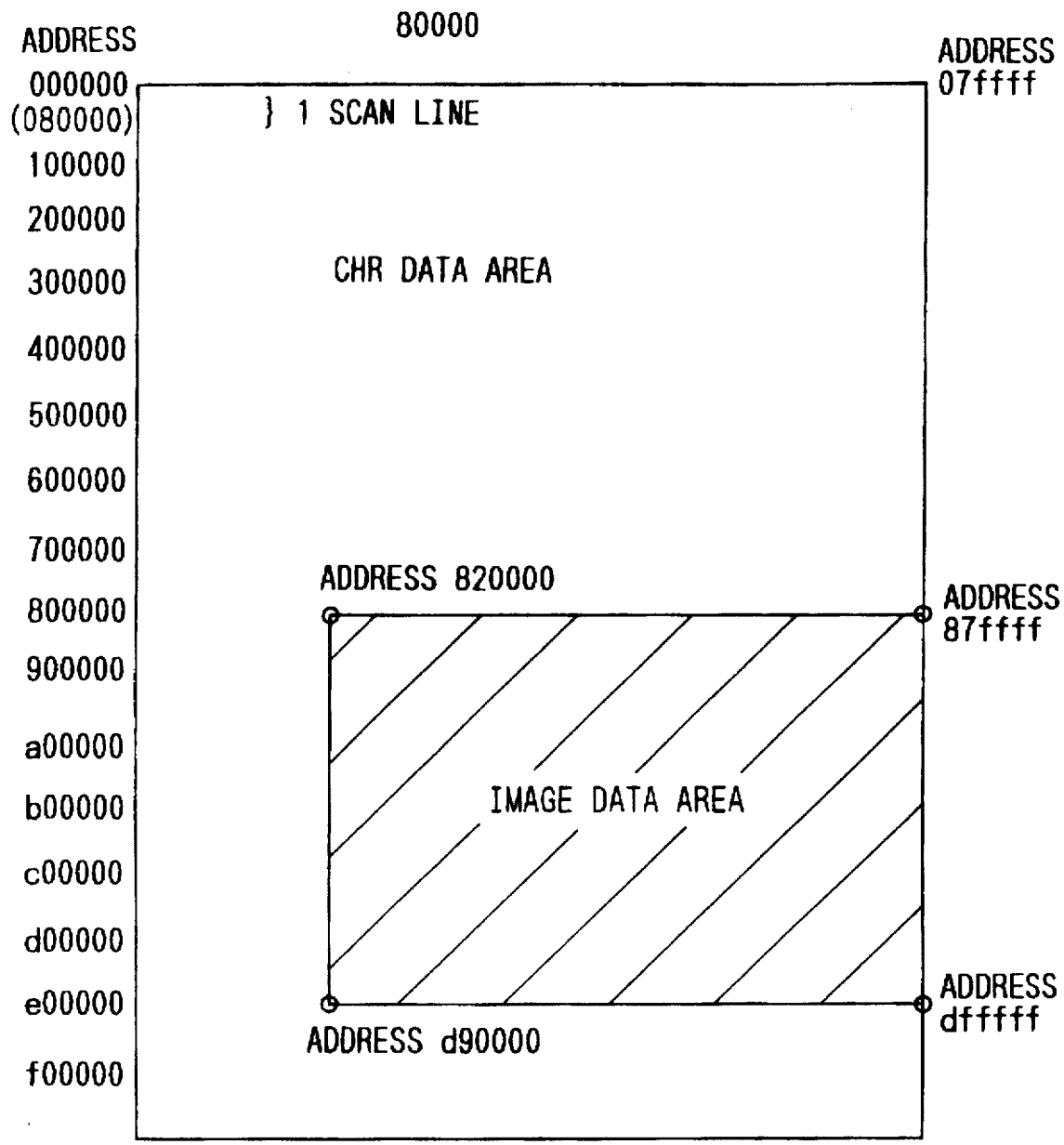
FIG. 2 is an explanatory diagram of a memory area in a page memory.
Figure 3A:
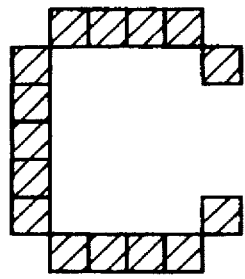
FIGS. 3A to 3C are explanatory diagrams of a character in the cases where a smoothing function is turned on and off.
Figure 3B:
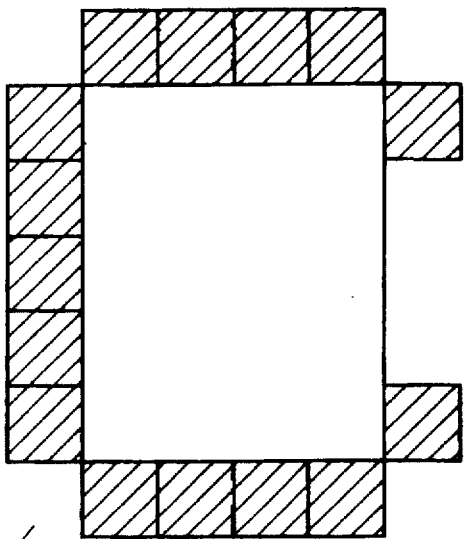
Figure 3C:
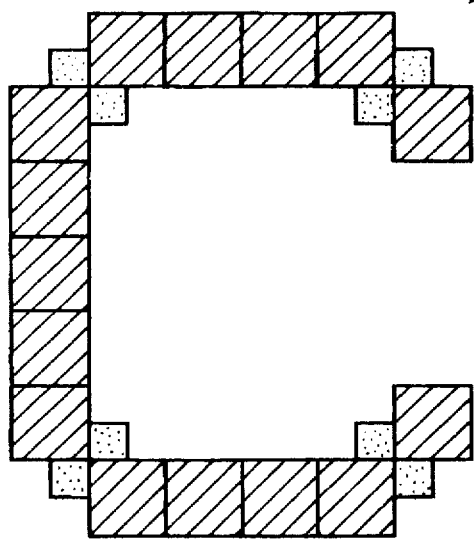
Figure 3C:

In FIG. 2, as a memory of one page, the data of one scan assumes 80000h, a start address of the image data area here is set to 820000h, an end address thereof is set to 87ffffh, and those of the next scan are set to 890000'h and 8ffffh, respectively. By holding the above address range and comparing, the on/off mode of the smoothing is decided.

For instance, in the case of page memory data as shown in FIG. 2, the start addresses are set to 820000h, 890000h, 920000h, . . . , d90000h and the end addresses are set to 87ffffh, 97ffffh, . . . , dfffffh.

The ranges are set to 820000h–87ffffh, 890000h–8ffffh, 920000h–97ffffh . . . d90000h–dfffffh.

In the case of the above address range, the smoothing is set to off.

It will of course be understood that the control procedure of FIG. 6 is properly repeated in accordance with each scanning line.

[Another embodiment]

In the above embodiment, the addresses are compared by the address comparator 60, thereby making the smoothing on/off signal line operative. However, it is also possible to construct the apparatus in a manner such that the data is sent directly from the address data memory 4 to the main controller 5, the address range is judged by software and the smoothing on/off mode is determined.

In the case where the host computer side has, for example, a WP or DTP function, when the attributes such as a fixed frame and the like which are provided in one page include image data, the main controller 5 in FIG. 1 recognizes position information of such a frame and smoothing-on information and the comparing process by the address comparator 60 is controlled.

Figures 1, 4:
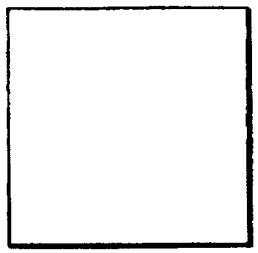
Figures 2, 4:
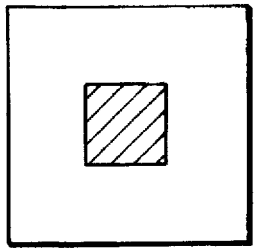
Figures 3, 4:
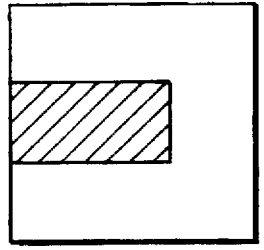
Figure 4:
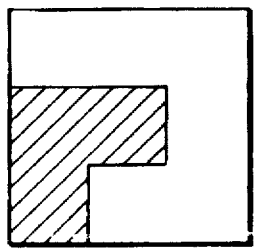
Figures 4, 5:
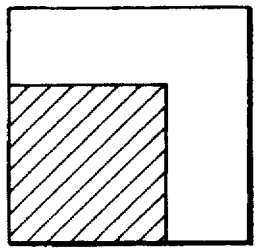
Figures 4, 5, 6:
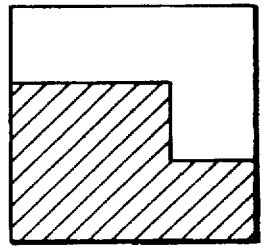
Figures 4, 5, 6, 7:
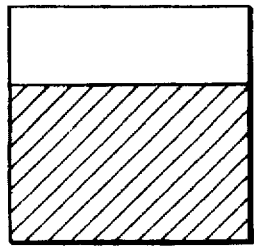

FIG. 7 is a diagram for explaining a flow (control flow) of the processes in the case of executing the processes shown in FIG. 6 when a resolution of the printer is changed.

When a change in resolution is instructed by an operation panel 300 in FIG. 8, which will be explained hereinbelow, or the like (S1 in FIG. 7), step S2 follows and the processes in FIG. 6 are executed. When NO in step S1, the data in the memory 3 is directly generated (S3). Thus, a visual deterioration of, particularly, a character portion in the case where the resolution is changed can be suppressed.

[Description of laser beam printer]

A structure of a laser beam printer is shown as an example of a printer to which the invention can be applied.

A construction of the laser beam printer to which this embodiment is applied will now be described with reference to FIG. 8.

Figures 4, 5, 6, 7, 8:
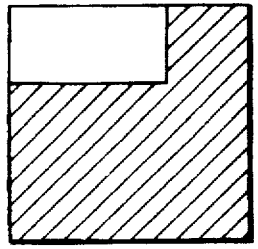

FIG. 8 is a cross-sectional view showing an internal structure of the laser beam printer (hereinafter, abbreviated to "LBP") of this embodiment. The LBP can register a character pattern from a data source (not shown), a standard format (form data), and the like. Although not shown in FIG. 8, the LBP includes the page memory 3 shown in FIG. 1.

In the diagram, reference numeral 100 denotes an LBP main body. The LBP main body 100 receives and stores character data (character codes), form data, macro instructions, etc., which are supplied from host computer 1 (in FIG. 1) connected to the outside. On the basis of those data, the LBP main body makes a corresponding character pattern, form pattern, etc., and forms an image on a recording paper as a recording medium. Reference numeral 300 denotes the operation panel on which operation switches, an LED display, and the like are arranged. Reference numeral 101 denotes a printer control unit for controlling the whole LBP 100 and for analyzing the character data or the like supplied from the host computer. The printer control unit 101 mainly converts the character data into the video signal of a corresponding character pattern and supplies the signal to a laser driver 102.

The laser driver 102 is a circuit for driving a semiconductor laser 103 and on/off switches a laser beam 104 which is emitted from the semiconductor laser 103 in accordance with the input video signal. The laser beam 104 is swung to the right and left by a rotary polygon mirror 105 and scans an electrostatic drum 106. Thus, an electrostatic latent image of the character pattern is formed on the drum 106. The latent image is developed by a developing unit 107 arranged around the drum 106 and, after that, the developed image is copy transferred onto the recording paper. A cut sheet is used as a recording paper. The cut recording sheets are enclosed in a sheet cassette 108 attached to the LBP 100 and are picked up and conveyed one by one into the apparatus by a feed roller 109 and carrying rollers 110 and 111 and are supplied to the drum 106. The frequency of the laser beam is changed by the laser driver 102, or the rotational speed of the drum 106 is controlled, thereby enabling a resolution of the printer to be varied.

[Description of the ink jet printer]

Figures 4, 5, 6, 7, 8, 9:
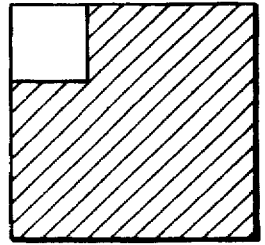
Figures 4, 5, 6, 7, 8, 9, 10:
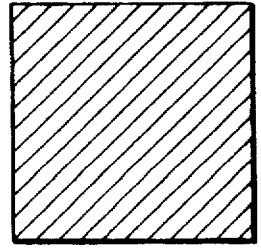
Figure 5:
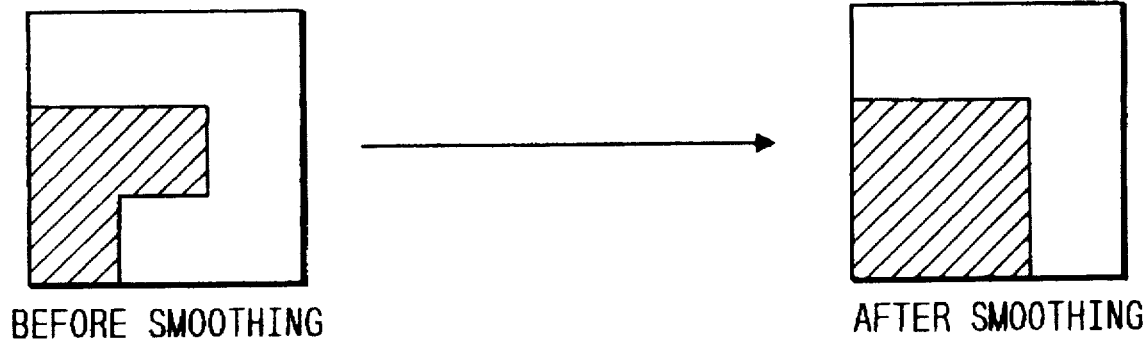
Figure 5:
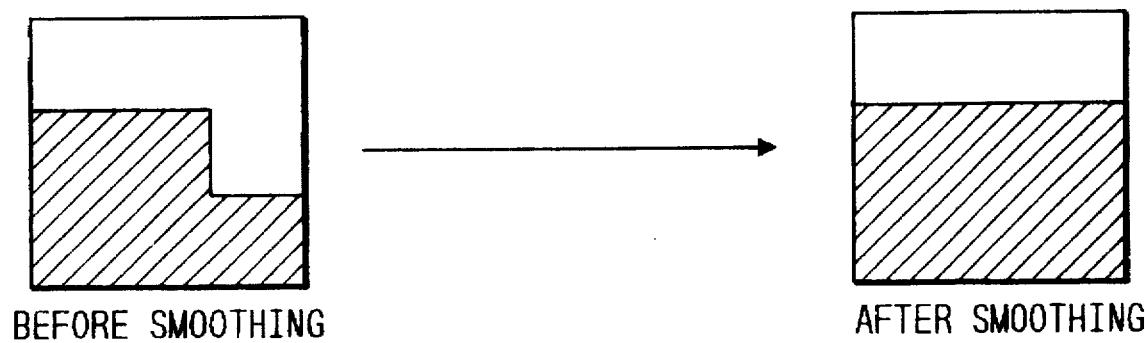
Figure 5:
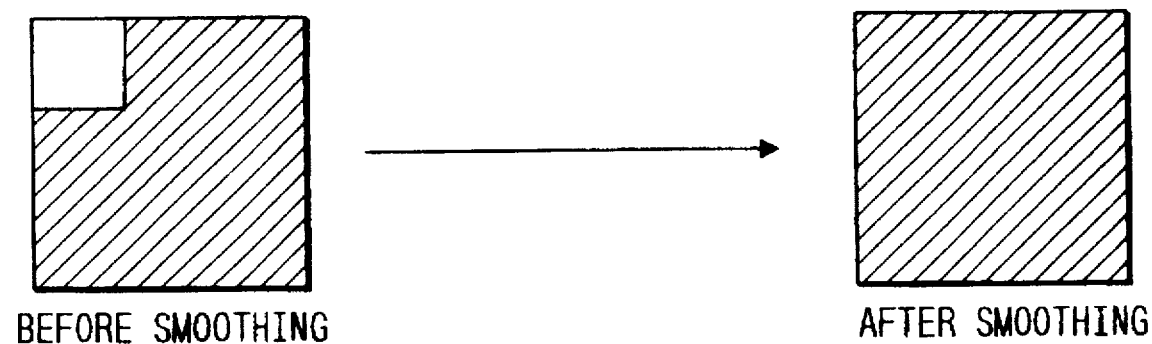
Figure 6:
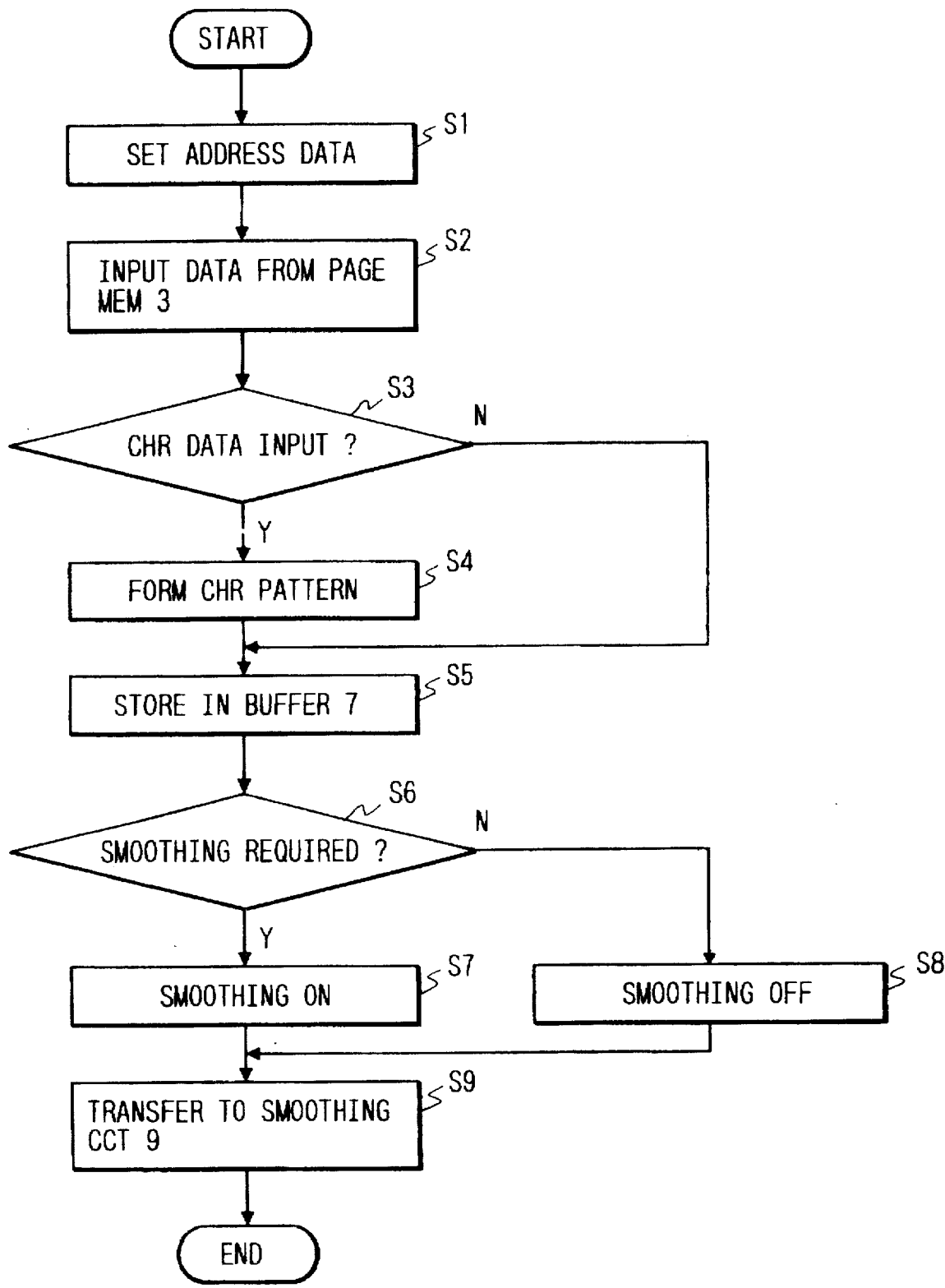
Figure 7:
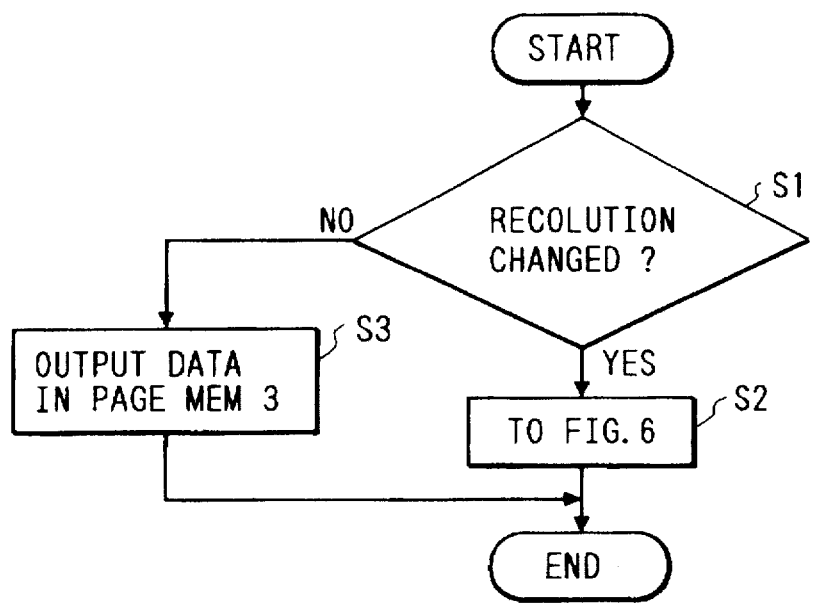
Figure 8:
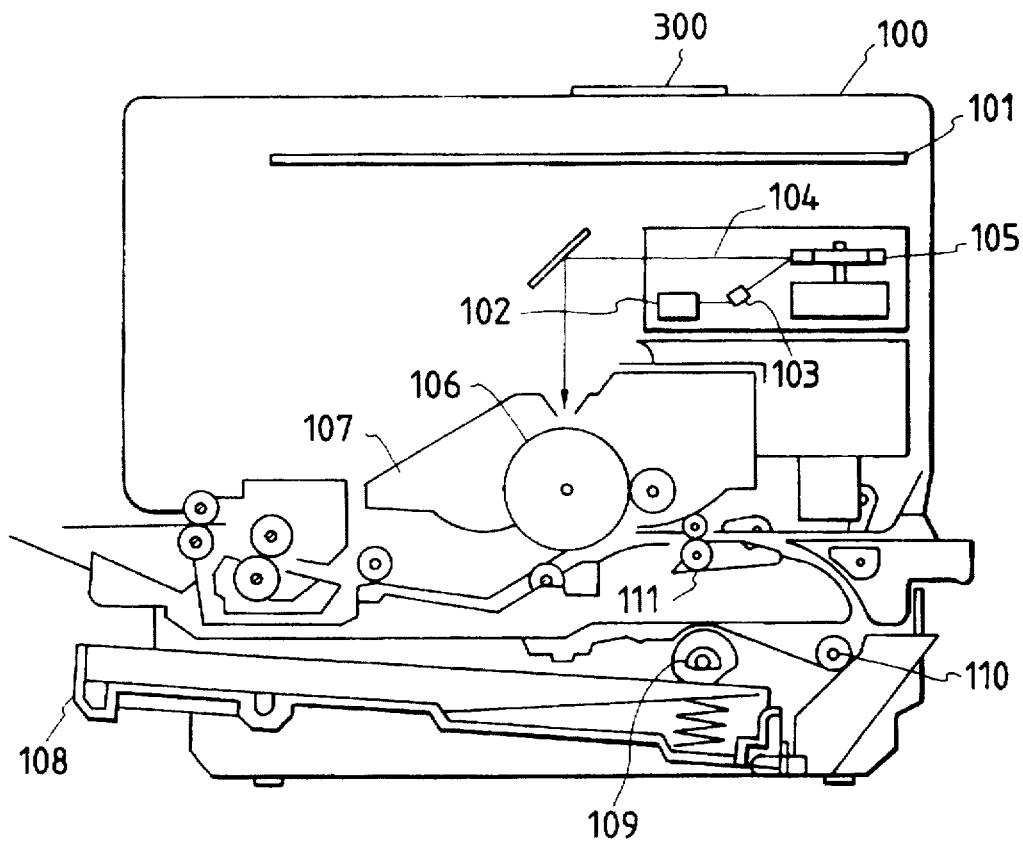
Figure 9:
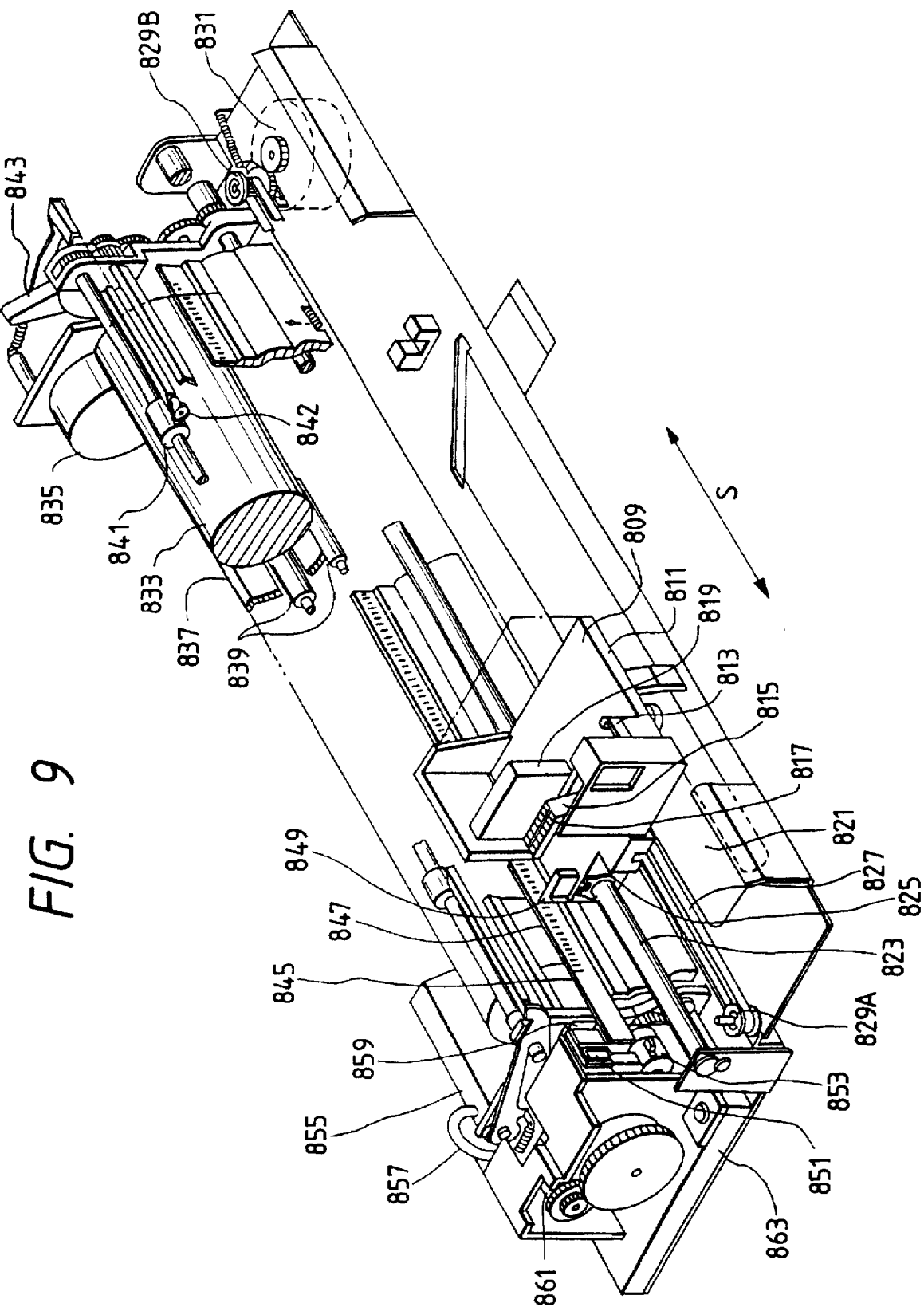

FIG. 9 shows an example of a construction of an ink jet printer using bubbles to which the invention can be applied.

A head cartridge having an ink jet recording head is mounted; 811 denotes a carriage for mounting the head cartridge thereon and for scanning in the direction shown by arrow S in the diagram; 813 a hook to attach the head cartridge to the carriage 811; and 815 a lever to operate the hook 813. A marker 817 is formed on the lever 815 in order to indicate a scale provided on a cover, which will be explained hereinbelow, thereby enabling a printing position, a set position, and the like by the recording head of the head cartridge to be read. Reference numeral 819 denotes a supporting plate to support an electric connecting portion for connection to the head cartridge 809. Reference numeral 821 denotes a flexible cable to connect the electric connecting portion and the control units of the main body.

Reference numeral 823 denotes a guide shaft to guide the carriage 811 in the S direction. The guide shaft is received in a bearing 825 of the carriage 811. Reference numeral 827 denotes a timing belt to which the carriage 811 is fixed and which transfers motive power to move the carriage 811 in the S direction. The timing belt is mounted on pulleys 829A and 829B arranged at both end portions of the apparatus. A driving force is transferred to the pulley 829B from a carriage motor 831 through a transferring mechanism such as gears and the like.

Reference numeral 833 denotes a platen roller for restricting a recording surface of a recording medium (hereinafter, also referred to as a "recording paper") such as paper or the like and for conveying it for recording or the like. The platen roller is driven by a carrying motor 835. Reference numeral 837 denotes a paper pan to lead the recording medium to the recording position from a paper feed tray side; 839 a feed roller, arranged on the way of the feeding path of the recording medium, for pressing the recording medium against the platen roller 833 and for carrying it; 841 a discharge roller, arranged on the downstream side than the recording position in the carrying direction of the recording medium, for discharging the recording medium toward a discharge port (not shown); and 842 a spur, provided in correspondence to the discharge roller 841, for pressing the discharge roller 841 against the recording medium and for applying a carrying force of the recording medium via the discharge roller 841.

Reference numeral 843 denotes a release lever for cancelling pressing forces of the feed roller 839, a pressing plate 845, and the spur 842 when the recording medium is set or the like.

Reference numeral 845 denotes the pressing plate for suppressing floating or the like of the recording medium at a position near the recording position and for assuring, adherence to the platen roller 833. In this embodiment, an ink jet recording head to record by emitting an ink is used as a recording head. Therefore, the distance between the ink emitting port forming surface of the recording head and the recording surface of the recording medium is relatively very small and must be precisely controlled so as to avoid contact between the recording medium and the emitting port forming surface. For this reason, the arrangement of the pressing plate 845 is effective. Reference numeral 847 denotes a scale formed on the pressing plate 845. Reference numeral 849 denotes a marker provided for the carriage 811 in correspondence to the scale. The printing position and set positions of the recording head can be also read by the above scale and marker.

Reference numeral 851 denotes a cap made of an elastic material such as a rubber or the like which faces the ink emitting port forming surface of the recording head at the home position. The cap 851 is supported so as to come into contact with and be separable from the recording head. The rubber cap 851 is used to protect the recording head in the non-recording mode and is also used when an emitting recovery process of the recording head is executed. The emitting recovery process denotes a process (pre-emission) such that the inks are emitted from all of the emitting ports by driving energy generating elements which are provided in the inside of the ink emitting ports and are used to emit the inks, thereby eliminating the factors of the defective emission such as air bubbles, dust, inks which are unsuitable for recording due to high viscosity, and the like. The emitting recovery process also denotes a process such that the above defective emission factors are eliminated by forcedly discharging the inks from the emitting ports.

Reference numeral 853 denotes a pump which is used for making an attracting force operative to forcedly drain the inks and for sucking the inks collected to the cap 851 when the emitting recovery process by such a forced discharge or the emitting recovery process by the pre-emission is performed. Reference numeral 855 denotes a drain ink tank to store the drain inks sucked by the pump 853. Reference numeral 857 denotes a tube to communicate the pump 853 with the drain ink tank 855.

Reference numeral 859 denotes a blade to wipe the emitting port forming surface of the recording head. The blade 859 is supported so as to be movable to the position to perform the wiping operation during the movement of the recording head by projecting to the recording head side and the backward position where the blade is not in engagement with the emitting port forming surface. Reference numeral 861 denotes a recovery system motor and 863 indicates a cam device which receives the transmission of a motive force from the recovery system motor and 863 indicates a cam device which receives the transmission of a motive force from the recovery system motor 861 and functions to drive the pump 853 and to move the cap 851 and blade 859, respectively.

Although not shown, the apparatus has a memory of a few lines, or may include a page memory in a manner similar to FIG. 1.

As for the process of the supplementary dots in FIG. 3 in the smoothing, it is sufficient to make the applications timing and amount of the thermal energy variable in emitting the ink droplet.

As described above, according to the invention, in the case of outputting a document in which characters and images mixedly exist, the smoothing can be turned on for the character and the smoothing can be turned off for the image, so that the printing can be properly executed.

As described in detail above, according to the invention, with respect to a document in which characters and images mixedly exist, the smoothing can be turned on for the character portion. Therefore, even in the case of a document in which characters and images mixedly exist, it is possible to execute a high quality output as if the image were generated at a resolution which is equal to or higher than the actual resolution of the printer unit.

As described in detail above, according to the invention, in the case of outputting a document in which characters and images mixedly exist, when the resolution of the printer is changed, the smoothing process is executed on the character portion and the document can always be generated with a high quality.

What is claimed is:

1. A print control apparatus comprising:

input means for inputting, from a host computer, input data having corresponding addresses, the input data comprising in mixture an image area in which an image pattern exists, a character area in which a character code exists and control codes for designating the image area and the character area, where the image area has a first address and the character area has a second address;

distinguishing means for distinguishing the first address and the second address on the basis of the control codes;

an address memory for storing the first and second addresses distinguished by said distinguishing means;

conversion means for converting the character code into a character pattern;

a pattern memory for storing the character pattern and the image pattern;

output means for outputting the character pattern and the image pattern in accordance with the addresses of the input data; and control means for comparing the addresses of the input data with the first and second addresses stored in said address memory and for controlling said output means in accordance with comparison results to automatically output the image pattern without a smoothing process and to automatically output the character pattern with a smoothing process.

2. An apparatus according to claim 1, wherein the smoothing process is executed by supplementing a dot to a dot pattern forming the character pattern.

3. An apparatus according to claim 1, wherein said output means outputs the image pattern and the character pattern with the smoothing process to a printer engine.

4. An apparatus according to claim 3, wherein the printer engine comprises a laser beam printer.

5. An apparatus according to claim 3, wherein the printer engine comprises an ink jet printer.

6. A print control method comprising:

an input step of inputting, from a host computer, input data having corresponding addresses, the input data comprising in mixture an image area in which an image pattern exists, a character area in which a character code exists and control codes for designating the image area and the character area, where the image area has a first address and the character area has a second address;

a distinguishing step of distinguishing the first address and the second address on the basis of the control codes;

an address memory step of storing the first and second addresses distinguished by said distinguishing step;

a conversion step of converting the character code into a character pattern;

a pattern memory step of storing the character pattern and the image pattern;

an output step of outputting the character pattern and the image pattern in accordance with the addresses of the input data; and a control step of comparing the addresses of the input data with the first and second addresses stored in said address memory step and of controlling said output step in accordance with comparison results to automatically output the image pattern without a smoothing process and to automatically output the character pattern with a smoothing process.

7. A method according to claim 6, wherein the smoothing process is executed by supplementing a dot to a dot pattern forming the character pattern.

8. A method according to claim 6, wherein said output step outputs the image pattern and the character pattern with the smoothing process to a printer engine.

9. A method according to claim 8, wherein the printer engine comprises a laser beam printer.

10. A method according to claim 8, wherein the printer engine comprises an ink jet printer.

* * * * *

UNITED STATES PATENT AND TRADEMARK OFFICE
CERTIFICATE OF CORRECTION

PATENT NO. : 5,740,339

DATED : APRIL 14, 1998

INVENTOR : NAOKI OHYAMA

It is certified that error appears in the above-identified patent and that said Letters Patent is hereby corrected as shown below:

IN THE DRAWINGS

Sheet 7 of 8  "RECOLUTION" should read --RESOLUTION--.

Column 1 line 26,   "is" should read --it-- and "outputted" should read --output--.

COLUMN 2 line 32,   "into" should read --in--; and
  line 53,   "be also" should read --also be--.

COLUMN 3 line 19,   "smoothing off" should read --smoothing-off--.

COLUMN 5 line 1,   ".from" should read --from--;
  line 14,   "side than" should read --side from--;

UNITED STATES PATENT AND TRADEMARK OFFICE
CERTIFICATE OF CORRECTION

PATENT NO. : 5,740,339

DATED : APRIL 14, 1998

INVENTOR : NAOKI OHYAMA

It is certified that error appears in the above-identified patent and that said Letters Patent is hereby corrected as shown below:

COLUMN 5 continued

```
line 28,   "assuring," should read --assuring--;
line 36,   "reason," should read --purpose,--; and
line 41,   "be also" should read --also be--.
```

Signed and Sealed this

Twenty-fourth Day of November,1998

Attest:

BRUCE LEHMAN

Attesting Officer

Commissioner of Patents and Trademarks